United States Patent [19]
Weissman

[11] 3,918,234
[45] Nov. 11, 1975

[54] CLIP PRIMARILY FOR T-BAR CEILINGS
[76] Inventor: Sydney Joseph Weissman, 49 Apollo Drive, Don Mills, Ontario, Canada
[22] Filed: Aug. 12, 1974
[21] Appl. No.: 495,688

[52] U.S. Cl. ............... 52/760; 248/300; 52/758 A; 52/645
[51] Int. Cl.² .......................................... F16B 2/20
[58] Field of Search .......... 52/760, 758 A, 645, 39; 248/58, 300, 317, 342; 211/60 T

[56] References Cited
UNITED STATES PATENTS
| | | | |
|---|---|---|---|
| 2,974,804 | 3/1961 | Maro | 211/60 T |
| 3,013,644 | 12/1961 | Smith et al. | 52/758 A X |
| 3,233,297 | 2/1966 | Havener | 52/760 X |

Primary Examiner—Werner H. Schroeder
Assistant Examiner—Wayne L. Shedd
Attorney, Agent, or Firm—Rogers, Bereskin & Parr

[57] ABSTRACT

A clip system is described for use in suspending lightweight articles from a T-bar or other support member forming part of a ceiling. The system employs a plurality of clips and associated elements. Clips of different lengths based on a standard-length module are described. Each clip is of relatively thin sheet form and is generally V-shaped in cross-section. Inwardly-directed flanges are provided at the upper ends of the sides of the clip and the clip is deformable to allow the flanges to be engaged over opposite sides of the support member. At least one aperture is provided in the clip so that an article to be suspended can be engaged therewith. A cross-over clip is also described for engagement with a standard elongate clip at an intersection between two T-bars or other support members.

15 Claims, 20 Drawing Figures

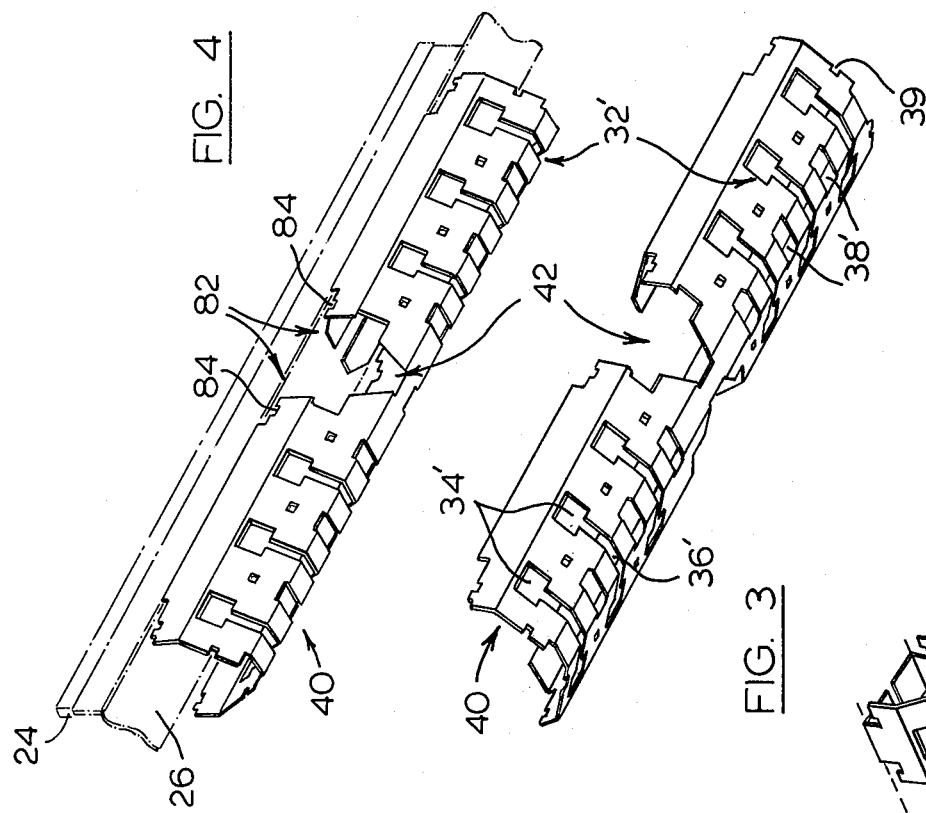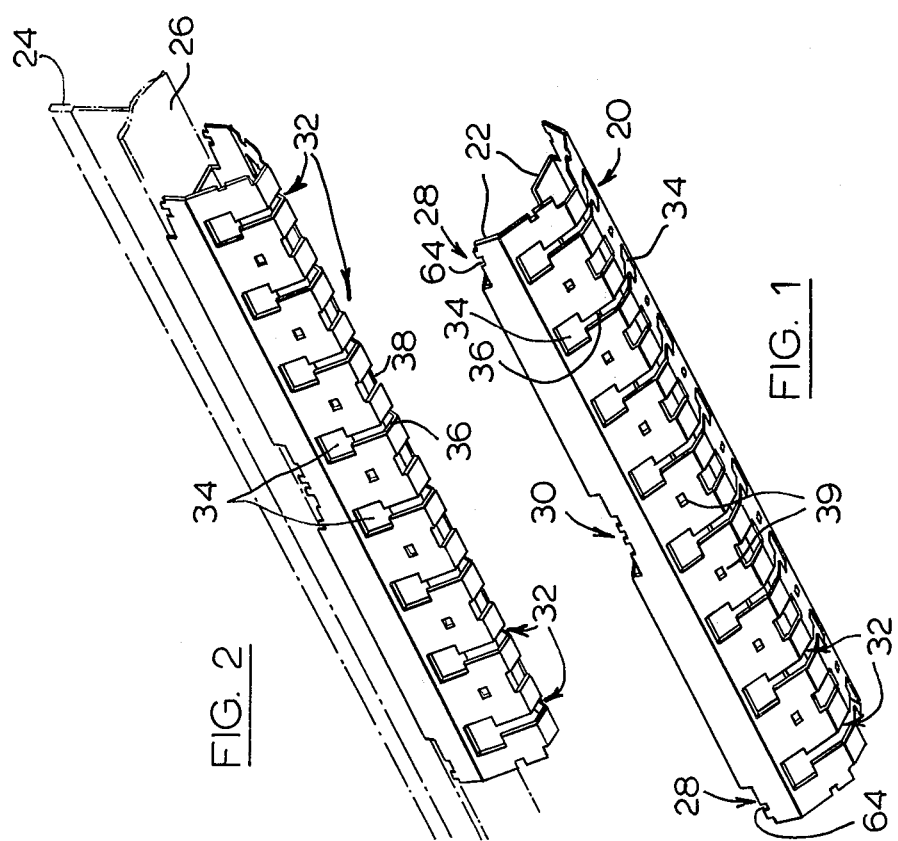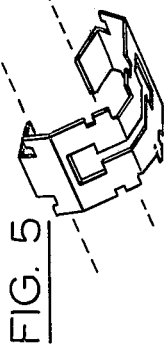

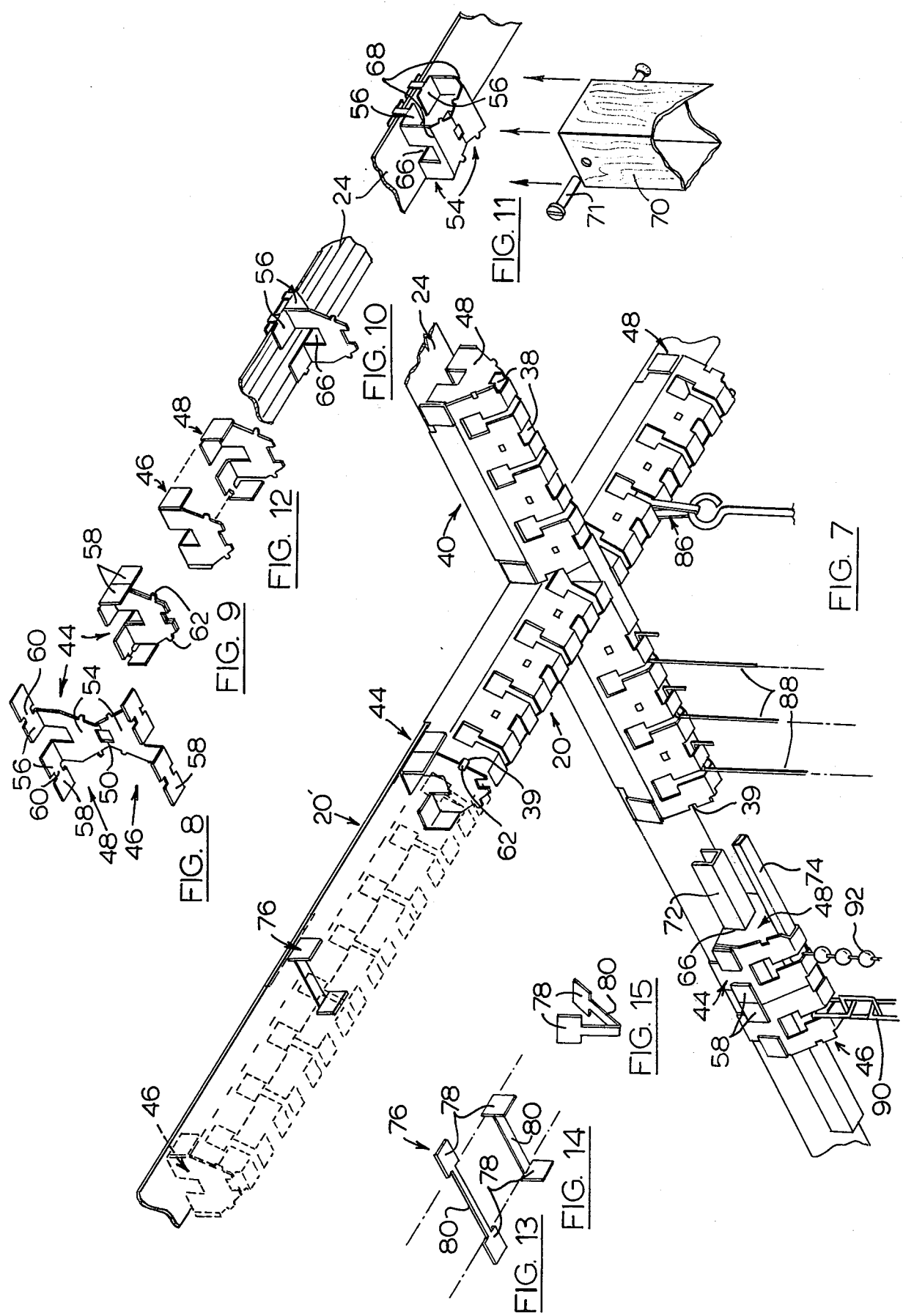

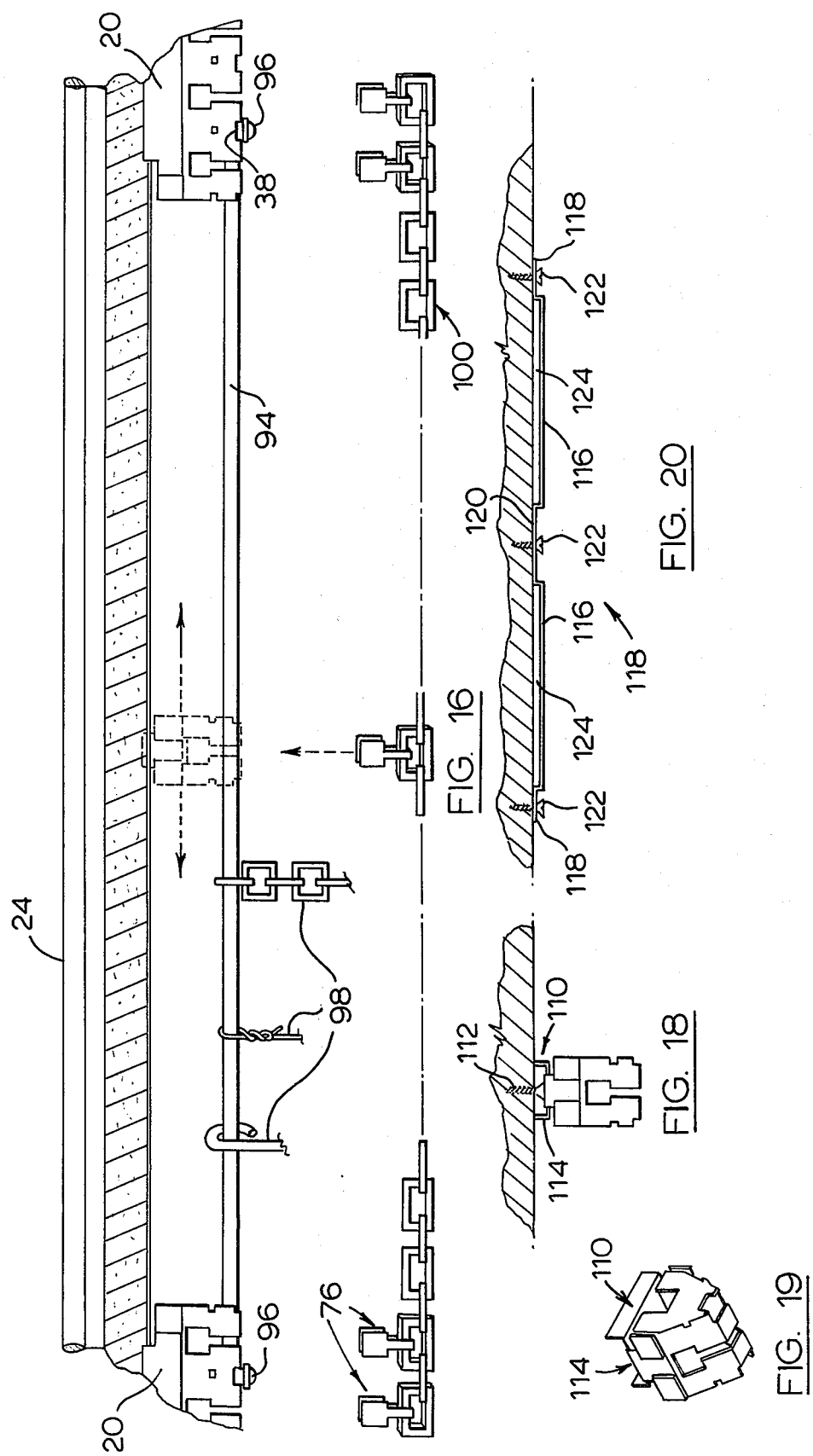

CLIP PRIMARILY FOR T-BAR CEILINGS

This invention relates to clips used to suspend lightweight articles from a ceiling. For example, clips of this kind may be used in a store to suspend lights, displays, signs or lightweight merchandise.

Clips according to the invention are primarily intended for application to so-called T-bar ceilings; that is, ceilings made up of tiles or panels supported on inverted T-section members called T-bars, which are interconnected in a rectangular grid pattern. The panels or tiles rest on the horizontal flanges of the T-bars so that the surface of the ceiling is formed by the lower faces of the panels or tiles and the bottom surfaces of the T-bars.

One conventional T-bar ceiling clip comprises a pair of hooked components connected by a screw. The components are hooked over opposite flanges of a T-bar and are drawn together by rotating the screw so that the components clamp on to the bar. It will be appreciated that such clips are difficult to install. Further, the carrying capacity of each clip is small.

In a makeshift method of suspending an article from a T-bar ceiling, a length of string or wire is looped over the T-bar and its opposite ends tied together to form a closed loop around the bar. The article is then engaged with the loop. It will be appreciated that the weight of the article tensions the loop so that the panels or tiles supported by the T-bar are lifted by the portions of the string or wire which extend downwardly on opposite sides of the stem of the T to the side edges of the flanges of the bar. Obviously, this spoils the appearance of the ceiling. Further, dirt and dust which have accumulated on the top surfaces of the panels and on the top part of the T-bar are disturbed when tying the loop of string or wire.

According to one aspect of the invention, there is provided an improved clip for use in suspending lightweight articles from a T-bar or other support member forming part of a ceiling. The clip is of relatively thin sheet form and is of hollow cross-section. Inwardly-directed flanges are provided at the upper ends of the sides of the clip and the flanges are engageable over opposite sides of the support member. At least one aperture is provided in the clip so that an article to be suspended can be engaged therewith.

A clip according to the invention may be fitted to a support member by squeezing its sides inwardly under manual pressure. In this event, the clip will be made of a comparatively soft material of low resilience (preferably a metal) so that the clip will remain in the shape into which it is squeezed. The squeezing action required to fit the clip may be performed manually or by using a simple hand tool. In an alternative embodiment, the clip could be made of a spring material and be fitted to a support member by springing apart its sides.

The invention will be better understood by reference to the accompanying drawings which illustrate various embodiments of the invention. In the drawings:

FIG. 1 is a perspective view from below of an elongate clip according to one embodiment of the invention for use on a T-bar ceiling, the clip being shown in its condition prior to engagement with a T-bar;

FIG. 2 is a view similar to FIG. 1 showing the clip engaged with a T-bar;

FIGS. 3 and 4 are views similar to FIGS. 1 and 2 respectively of a so-called cross-over clip according to the invention, used at a junction between two T-bars;

FIG. 5 and 6 are views similar to FIGS. 1 and 2 respectively showing an alternative form of clip;

FIG. 7 is a perspective view from below illustrating a junction between two T-bars fitted with a standard clip and across-over clip as shown in FIGS. 2 and 4 respectively;

FIG. 8 is a perspective view from below of a so-called double closer element;

FIG. 9 is a view similar to FIG. 8 showing the closer element in one position of use;

FIG. 10 is a view similar to FIG. 9 illustrating one use of a double closer element;

FIG. 11 is a partly exploded perspective view from below illustrating a further use of a double closer element;

FIG. 12 is a perspective view from below showing two halves of a double closer element positioned to illustrate how they may be used to close off the ends of a clip;

FIG. 13 shows a lock element used in the arrangement of FIG. 7, the element being shown in its position preparatory to engagement with a clip;

FIG. 14 shows the lock element of FIG. 13 in its operative position;

FIG. 15 illustrates an alternative use for the lock element of FIGS. 13 and 14;

FIG. 16 is a side view illustrating additional fitments which may be used with the clips shown in the previous figures;

FIG. 18 is a side view of a clip of the form shown in FIGS. 5 and 6 fitted to an adaptor for a plaster ceiling;

FIG. 19 is a perspective view corresponding to FIG. 18; and,

FIG. 20 is a side view of an adaptor for a plaster ceiling for use with an elongate clip of the form shown in FIGS. 1 and 2 or in FIGS. 3 and 4.

Figure 17:
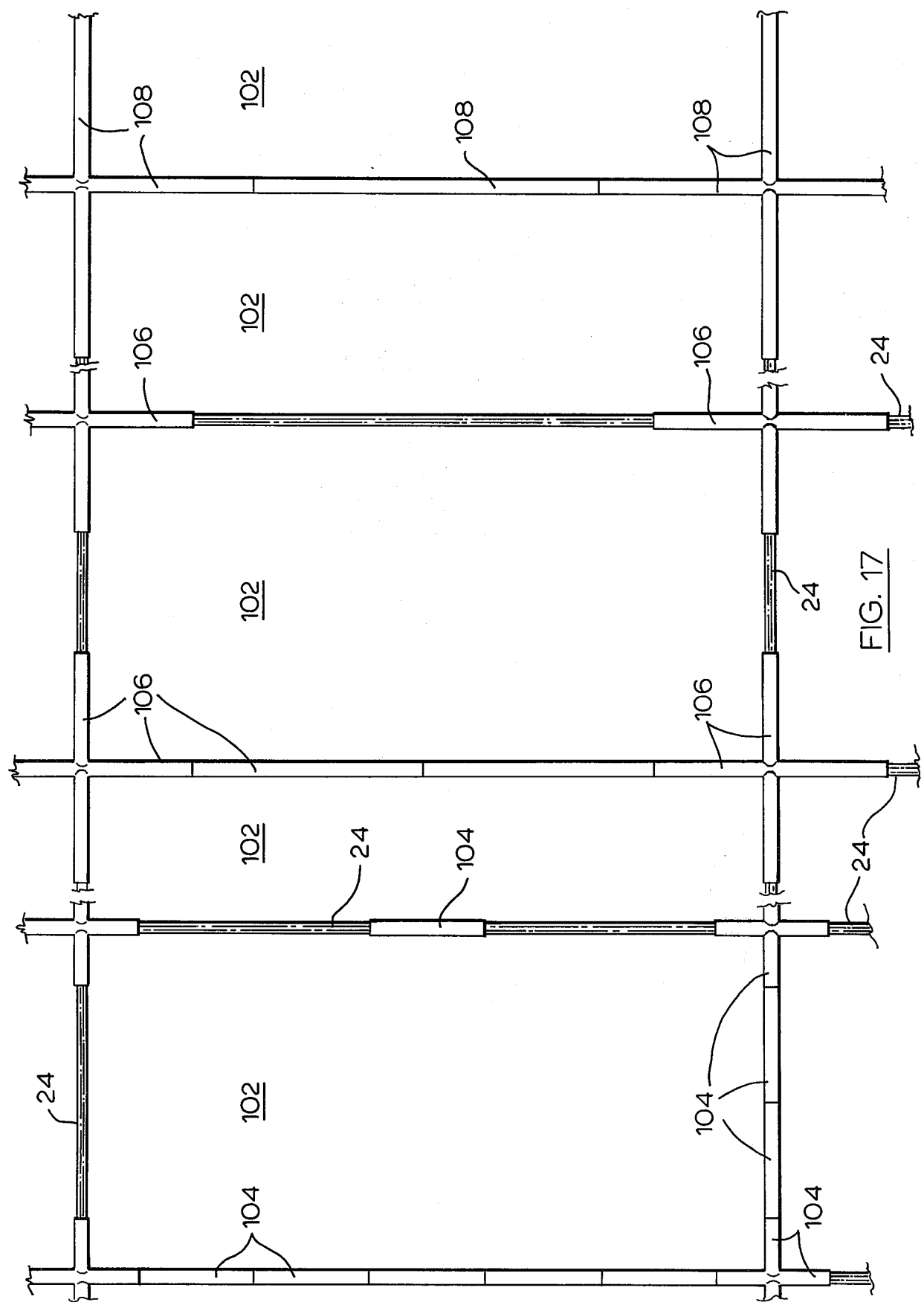
FIG. 17 is a diagrammatic underneath plan view of part of a T-bar ceiling fitted with clips in accordance with the invention.

Reference will first be made to FIGS. 1 and 2 which show a primary form of elongate clip in accordance with the invention. The clip is denoted 20 and is shown in FIG. 1 in its condition prior to installation; that is, as supplied to a customer. It will be noted that the clip is of shallow V-shape in cross-section and has a pair of inwardly-directed flanges 22 at the upper end of each side.

The clip is stamped from thin gauge sheet low resilience metal and is bent to the cross-sectional shape shown in FIG. 1. In this form, the spacing between the opposed inner edges of the flanges 22 is just sufficient to allow the clip to be engaged over the bottom limb of a T-bar. Comparatively light manual pressure applied to opposite sides of the clip can then be employed to cause the flanges 22 to move inwardly and engage above the bottom limb of the T-bar. In FIG. 2, the clip of FIG. 1 is shown in this engaged condition. The T-bar is shown in ghost outline in FIG. 2 and is generally denoted 24; its bottom limb is denoted 26. The design of the clip is such that it does not lose its "clean" flat-sided appearance in being fitted to a T-bar.

Each side of clip 20 has a shaped notch 28 at each end, the purpose of which will become apparent later. In addition, each side of the clip is provided intermediate its ends with a central, shaped notch 30. The bottom edge of this notch has a profile similar to that of the bottom edge of two notches 28 placed end to end. Accordingly, the clip is symmetrical about a transverse plane passing centrally through notches 30. In addition, each clip 20 is provided with a plurality of transverse cutouts 32 of generally dumb-bell shape arranged in spaced parallel positions along the length of the clip. Each cutout 32 defines a pair of rectangular apertures, 34, one in each side of the clip, and a narrow slot 36 joining the apertures 34. A further rectangular aperture is provided in the bottom of the clip between each pair of cutouts 32. The cutouts 32 and apertures 38 are provided to permit suspension elements to be engaged with the clip 20, as will be described in relation to FIGS. 7 and 16. In addition, a series of small square apertures 39 are provided in each side of the clip intermediate the cutouts 32. It will be noted that these apertures 39 are open at the ends of the clip.

Clip 20 has eight dumb-bell shaped cutouts 32. This clip is based on a one inch module and is accordingly 8 inches long. Clips of any length based on this one inch module may be provided. FIGS. 5 and 6 show a clip in the form of a single 1 inch module. It is anticipated that a range of different length clips based on the 1 inch module will be made available to cater for a wide range of different clip layouts on a ceiling. For instance, in addition to the one inch and eight inch clips shown, clips of 4 inches, 16 inches and 24 inches in length may be made available. Custom made lengths may also be produced.

To cater for situations in which clips are required at junctions between two T-bars, cross-over clip as shown in FIGS. 3 and 4 is provided. This clip is denoted 40 and is essentially the same as the clip 20, except that it is modified by the provision in each side of a V-shaped cutout 42, the shape of which is the same as the profile of an unmodified clip 20 when it is fully engaged with the T-bar as shown in FIG. 2. Other cutouts and apertures in the cross-over clip section 40 are similar to the corresponding cutouts in clip 20 and are denoted by primed reference numerals.

FIG. 7 illustrates the way in which a primary clip 20 and a cross-over clip 40 can be used together at the junction between two T-bars 24. When installing the clips, the primary clip 20 is firstly engaged with the relevant T-bar 24 and is positioned symmetrically across the junction as shown. The cross-over clip 40 is then positioned so that its V-shaped cutouts 42 correspond with opposite sides of the primary clip 20. Finally, the cross-over clip 40 is squeezed onto the T-bar 24 as previously explained so that its flanges 22' engage above the flanges of the bottom limb of the T-bar.

FIG. 7 also illustrates how two clips can be joined together end to end. When two clips are to be mounted in end to end relationship on the same T-bar, it will normally be sufficient to simply position the clips in abutment with one another. However, where it is essential that two clips do not move apart, or where a clip is to be fitted into a limited space on a T-bar, a double closer element is used between the abutting ends of the two clips. In FIG. 7 a second clip is indicated in ghost outline as 20' in end-to-end abutting relationship with the clip 20 and it will be assumed that the two clips are to be joined so they cannot move apart.

A double closer element 44 of the form shown in FIGS. 8 and 9 is used between the opposed ends of the two clips 20, 20' to be joined. The element comprises two symmetrical halves 46, 48 which are joined together along a fold line 50 at the bottom edge of the element. The element is in fact stamped in the flat with two halves lying in a common plane. FIG. 8 shows how the two halves are joined at the fold line 50. Each half of the element comprises a generally triangular main portion 54 and a top portion 56 which extends in a plane at right angles to the main portion 54. The top portion 56 is shaped to define at each end a tab 58 which is joined to the top portion by a "neck" 60. FIG. 9 shows a double closer element with the tabs 58 in the downwardly folded positions which they normally occupy in use. The triangular portion of each half of the element is also provided with two projections 62 on its inclined edges. The purpose of these projections will be described later.

Referring back to FIG. 7, one-half of a double closer element 44 is first engaged with the clip 20 which is already in position. It will be remembered that each side of the clip has a notch 28 in each end. The lower end of this notch defines a downwardly-directed rectangular recess 64 (see FIGS. 1 and 2). The neck 60 of each end tab 58 of closer element 44 and said recess are dimensioned so that the neck fits into the recess. Accordingly, when the closer element is engaged with the clip 20, the neck 60 at each side of the element engages in the corresponding recess 64 in the clip, retaining the element 44 against movement longitudinally of the end of the clip 20. Further, the projections 62 on the element engage in the open-ended apertures 39 at the end of the clip 20 so that the element is prevented from being pushed inside the clip. The tabs 58 are finally folded down against the outer surface of the clip to retain the closer element. The fresh clip 20' (which is in the condition shown in FIG. 1) is then lifted vertically into position below the T-bar 24 so that the notches 28 in its end adjacent clip 20 engage with the closer element retained in the end of the clip 20. The fresh clip section is then squeezed onto the T-bar as explained above. Finally, the second set of end tabs 58 on the closer element are folded downwardly to grip the clip 20'.

FIG. 10 illustrates one way in which a double closer element 44 may be used alone on a T-bar 24. It will be noted that the end tabs 58 of the closer element are folded upwardly and back onto the bottom limb of the T-bar to grip the same. A double closer element fitted in this way can be used, for example, as a lightweight hanger, the articles to be suspended being engaged with aperture 66 in the main portion of the element. Alternatively, the element could be used as a "wire runner". The wire, or a guide channel carrying the wire, may be passed through the aperture 66.

FIG. 11 illustrates a still further use for a double closer element. In this view the element is shown fitted to a T-bar in the same way as the element shown in FIG. 10. In this case, however, the two top portions 56 of each half of the element are folded inwardly towards one another and the two main portions 54 are bent up at their lower ends about transverse parallel fold lines 68 so that the element adopts a generally box-shaped configuration. In this configuration, the element can be used as a support for an upright tubular post member such as that denoted 70 in FIG. 11. It is to be understood that the post 70 is essentially of lightweight construction such as would be used, for example, as part of a display in a store. The post 70 is engaged over the box-form element, as indicated by the arrows in FIG. 11 and is secured to the element by a pin comprising two head sections 71, which are adapted to be screwed together in co-axial relationship so as to extend through apertures in the post 70 which align with the apertures 66 in the closer element.

As has already been mentioned each double closer element 44 comprises two halves 46, 48 joined at a fold line 50. These halves can be separated by repeated bending about the fold line, and each half used as a single closer element to close off the end of a clip for neatness of appearance. In FIG. 12, the two halves 46, 48 are shown in opposed positions such as they would occupy when closing opposite ends of the same clip. The end tabs 58 are folded downwardly (onto the outer surface of the clip in use), and the necks 60 joining the respective tabs to the main part of the element are received in the respective recesses 64 in the clip, as described above in connection with a double closer element.

FIG. 7 shows two of the single clips of FIGS. 5 and 6 positioned side by side on a T-bar 24 and joined by a double closer element 44. The outer ends of the respective clips are closed by single closer elements 46, 48. This portion of FIG. 7 also shows how clips fitted with closer elements can be used to carry a plastic channel 72 or tube 74 in which electrical wiring can be run so as to be concealed by the channel or tube. The channel or tube is simply push fitted through the relevant aligned apertures 66 in the closer elements. Similar channels or tubes could, of course, be fitted in similar fashion to elongate primary and cross-over clips, provided, of course, that appropriate measures are taken to allow the wires to cross over where they pass through intersecting clips.

FIGS. 13 to 15 show a lock element 76, the main function of which is to ensure that elongate clips are firmly clipped to the relevant T-bars and are of uniform width along the lengths. This is particularly important in the case of long clips. As can be seen, each lock element 76 is of generally dumb-bell shape, having a pair of square end tabs 78 joined by a narrow strip portion 80. The lock elements 76 are in fact of the same shape as the slots 36 in the clip sections. The elements may be formed by the metal stampings removed when the slots 36 are formed in manufacture of the clips. Alternatively, where this is not possible because of manufacturing techniques, the lock elements 76 may be produced separately. In this event, modifications to the shape of the element may be made. FIG. 13 shows a lock element as produced and FIG. 14 shows the element in its normal position of use. Referring back to FIG. 7, a lock element 76 is shown in use at the centre of the additional clip 20' engaged with notches 30 in opposite sides of the clip. It will be noted that the end tabs 78 are turned downwardly at their junctions with the centre strip portion 80. The length of the strip portion is equal to the required fitted width of the clip so that when the tabs are turned downwardly, the lock element ensures that the width of the clip is uniform along its length.

In addition, two lock elements 76 are used on the cross-over clip 40 in FIG. 7 adjacent clip 20 to ensure that the cross-over clip is securely mounted on its associated T-bar and is of uniform width along its length. Referring back to FIGS. 3 and 4, it will be seen that each cross-over clip is formed adjacent each side of the V-shaped cutout 42 therein with a notch 82 similar the notch at the ends of each clip. This notch 82 defines a recess 84 similar to the recess 64 in notch 28. Accordingly, a pair of lock element 76 can be positioned one each side of the V-shaped cutouts 42 transversely with respect to the T-bar with the strip portion 80 of each element 82 received in the relevant recess 84 in notch 82. The end tabs 78 are bent downwardly to secure the element.

FIG. 15 illustrates an alternative application of a lock element. Here, the element is folded to a V-shape about the centre of the strip portion 80. The tabs 78 of the element can then be inserted into a clip section by way of one of the apertures 38, as shown in FIG. 7. The lock element will then be retained within the section and can be used to suspend articles from the section as shown, for example, at 86 in FIG. 7. Each such article can be engaged with a lock element at ground level before the element is fitted to the clip. This view also shows how hooks 88, as well as chains 90 and other suspension elements can be used at pre-measured intervals. A beaded chain is shown at 92 as an example of another type of suspension element.

As has already been mentioned, clips in accordance with the invention can be butted together end to end, joined by double closer elements if necessary, to form continuous lengths. Further, cross-over clips can be used to bridge junctions between T-bars. Accordingly, the invention provides a clip system which is extremely versatile in that any arrangement of clips can be used. FIG. 16 shows how auxiliary suspension elements can be used with the clips. In that view, the ends of two standard clips 20 are visible, being mounted on a T-bar 24. The ends are spaced from one another and connected by a rigid bar 94 having downturned ends 96 which project downwardly through the apertures 38 in the clips 20 nearest their opposed ends. The bar 94 provides a suspension medium between the clips which can be used to carry a variety of suspension elements as indicated by the examples designated 98.

An additional single-module clip is indicated in ghost outline at 99 to illustrate how additional support can be provided for the bar 94 if required. This view also illustrates how a chain 100 can be suspended horizontally from the clip sections 20 by means of lock elements 76 bent to a V-configuration as described above and looped through appropriate links of the chain. The lock elements are engaged in the slots 36 in the clip sections as described previously.

FIG. 17 illustrates a number of possible clip layouts which may be used in accordance with the invention. The T-bars for the ceiling in question are visible at 24 and are arranged in a 24 × 48 inch grid pattern as is conventional. Ceiling tiles or panels supported on the T-bar are indicated at 102. Clips 20 and cross-over clips 40 are provided in 8 inch, 16 inch and 24 inch lengths, as designated respectively by the reference numerals 104, 106 and 108. The same reference numeral is used to denote both standard and cross-over clips in each size for convenience. FIG. 17 illustrates the versatility of the system according to the invention.

The clips illustrated in the accompanying drawings have been designed primarily for application to T-bar ceilings. However, as has already been mentioned, the same clips can be applied to conventional plaster ceilings using adaptors. FIGS. 18 and 19 show an adaptor for use with a clip of the form shown in FIGS. 5 and 6. The adaptor is denoted 110 and is generally U-shaped in cross-section, being made of thin-gauge sheet metal. The adaptor has a central aperture formed in its base to receive a screw 112 by which it is secured to a ceiling (preferably at the position of a joist). The adaptor is dimensioned such that the flanges on the clip can be engaged over the ends 114 of the base of the adaptor as shown.

FIG. 20 is a side view of an adaptor 116 for use with a clip of elongate form. This adaptor is made from a rectangular strip of sheet metal of a width equal to the width of the bottom limb of a standard T-bar and shaped to define stepped portions 118 at each end and a square shaped centre stepped portion 120. The adaptor is secured to the ceiling by screws 122 passing through apertures in these stepped portions. The portions 124 intermediate the stepped portions are of rectangular shape in plan view and are each of a length approximately equal to the length of one of the flange sections 22 between the notches 28 and 30 of an elongate clip. Accordingly, an elongate clip is fitted to the adaptor 116 by engaging the said flanges over the side edges of the portions 124 of the adaptor. Closer elements and other components can then be fitted to the clip as described previously.

The length of the central stepped portion 120 of the adaptor is slightly greater than the width of the adaptor so that two adaptors can be crossed over with their central stepped portions 120 in overlapping relationship to in effect simulate the junction between two T-bars. A standard elongate clip and a cross-over clip are then used at this junction, as described in connection with FIG. 7.

The clip and other components referred to in the preceding description may be produced by conventional die stamping techniques. The metal from which the clips are made may be appropriately coloured or surface coated before the clips are stamped therefrom. In some cases, it may be necessary to coat or colour only one side of a sheet as the surface finish will normally be required only on the exterior of the clip. Of course, in some cases it may be preferable to apply a surface finish to a clip after the clip has been produced.

It should also be noted that the shape of the clip shown in FIGS. 1 to 6 has been carefully chosen for neatness of appearance and efficiency in use. The cross-sectional shape of the clip is such that the centre of gravity of a load suspended from a clip lies directly on the centre line of the T-bar to which the clip is fitted, so that the flanges 22 of the clip are maintained in firm engagement with the T-bar flange. The apertures and cutouts in the clips facilitate bending of the clips during their manufacture, in addition to permitting articles to be suspended therefrom.

It will be appreciated that the preceding description applies to one embodiment of the invention only. Amongst possible modifications, a clip according to the invention could be made of spring steel or other resilient material. The clip would then be manufactured in its "as fitted" cross-sectional shape, i.e., as shown in FIG. 2. To fit the clip to a T-bar, its sides would be sprung apart, the flanges 22 engaged over the T-bar and the flanges allowed to return due to the inherent resilience of the material from which the clip is made.

I claim:

1. A clip for use in suspending lightweight articles from a support member forming part of a ceiling, wherein the clip is of relatively thin sheet form and has inclined sides defining a generally V-shaped symmetrical cross-section, wherein inwardly-directed flanges are provided at the upper ends of said sides, the clip being deformable to allow said flanges to be engaged over opposite side edges of a support member, and wherein at least one aperture is provided in the clip and is located at least in part on a line of symmetry of the cross-section of the clip so that, in use, an article can be engaged in said aperture and suspended from the clip, with its centre of gravity on said line of symmetry.

2. A clip as claimed in claim 1 wherein the aperture is generally dumb-bell shaped, comprising an elongate slot portion which extends transversely of the clip from one side to the other, and enlarged end portions in each side of the clip joined by said slot portion.

3. A clip as claimed in claim 2 which is of elongate form, wherein the clip is provided with a plurality of said dumb-bell shaped apertures arranged at predetermined mutual spacings along the length of the clip.

4. A clip as claimed in claim 1 which is of elongate form and is modified by the provision in each side, of a generally V-shaped open-topped cutout positioned intermediate the ends of the clip, the profile of said cutout conforming with the external cross sectional shape of an unmodified clip in its fitted condition, whereby an intersection between two of said support members can be bridged by an unmodified clip which extends across the said intersection and a modified clip which is fitted over the unmodified clip.

5. A clip as claimed in claim 1, which is shaped in manufacture so that its cross-section initially defines a relatively shallow V, and which is made of thin gauge sheet metal, whereby the clip can be manually deformed by squeezing its sides towards one another to engage said flanges over opposite side edges of a support member.

6. The combination of a clip as claimed in claim 1 which is adapted to be joined end to end with one or more similar clips, and a double closer element adapted to be fitted between the opposed ends of two such clips, wherein the said element comprises:

a main portion which is adapted to be fitted transversely across the end of the clip and which has a profile similar to the cross-sectional shape of the clip in its fitted condition;

two top portions which project in opposite directions at right angles from said main portion and which are of a similar width to said main portion;

foldable tabs at opposite ends of each said top portion; and, a narrow neck portion joining each said tab to the relevant top portion;

and wherein each side of the clip is provided at each end with a recess shaped to receive and laterally restrain one of said neck portions, whereby the double closer element can be fitted between opposed ends of two similar clips positioned end to end by engaging the neck portions of the element with the respective recesses in opposed ends of the clips, and bending the said tabs downwardly onto the outer surfaces of each said clip, so as to restrain the clips against movement away from one another.

7. The combination of a clip as claimed in claim 1 and at least one single closer element which is adapted to be fitted to an end of the clip to close the same, wherein the element comprises:

a main portion which is adapted to be fitted transversely across the end of the clip and which has a profile similar to the cross-sectional shape of the clip in its fitted condition;

a top portion which projects at right angles to said main portion and which is of a similar width to said main portion;

a foldable tab at each opposite end of said top portion; and, a narrow neck portion joining each said tab to said top portion;

and wherein each side of the clip is provided at each end with a recess shaped to receive and laterally restrain one of said neck portions, whereby the element can be fitted over an end of the clip with said neck portions engaged in the recesses at opposite sides of said clip end, and said tabs bent downwardly against the sides of the clip to secure the element to the end of the clip.

8. The combination of:
a. a clip as claimed in claim 1 which is of elongate form and is fitted to a support member across an intersection between said member and a second support member;
b. a similar clip which is modified by the provision in each side of a generally V-shaped open-topped cutout positioned intermediate its ends, the profile of said cutout conforming with the external cross-sectional shape of said first mentioned clip, and the modified clip being fitted to the second support member over said first mentioned clip; and,
c. a pair of lock elements fitted transversely of the modified clip adjacent respectively opposite sides of the first mentioned clip, each said element comprising a central strip portion and enlarged end portions at opposite ends of the strip portion, said strip portion being of a length substantially equal to the fitted width of the modified clips and the enlarged end portions of the elements being folded downwardly against the outer surface of the modified clip to prevent lateral expansion of the clip adjacent the first-mentioned clip.

9. The combination of:
a. a clip as claimed in claim 1 which is formed at least one position intermediate its ends with transversely aligned recesses in its side walls; and,
b. a lock element comprising a central strip portion and enlarged end portions at opposite ends of the strip portion, said strip portion being of a length substantially equal to the spacing between said recesses in the sides of the clip, whereby the lock element can be inserted through said recesses transversely of the clip and said enlarged end portions folded downwardly against the outer surface of the clip at the junction with the strip portion, so as to prevent lateral expansion of the clip at the position of said lock element.

10. A double closer element which is adapted to be secured to a support member forming part of a ceiling and which comprises a main portion adapted to be fitted transversely across the member and having a generally V-shaped profile, two top portions which project in opposite directions at right angles to said main portion, a foldable tab at opposite ends of each said top portion, and a narrow neck portion joining each said tab to the relevant top portion, whereby the clip can be secured to said support member by bending the said tab portions upwardly and back to engage opposite sides of said member.

11. An element according to claim 10, wherein said main portion comprises two generally triangular members, each of which carries one of said top portions at its upper end, and the bottom portions of which are connected at a fold line, whereby the clip can be separated into two halves by breaking said members apart along said fold line.

12. An element as claimed in claim 11, wherein the said triangular members are adapted to be bent about parallel fold lines positioned transversely of the members so that the element adopts a generally box-shaped configuration; whereby, in use, a hollow vertical member can be engaged over and secured to the element.

13. A ceiling structure fitted with a clip for use in suspending lightweight articles from the structure, wherein the structure comprises a plurality of elongate support members arranged in a rectangular grid pattern, each member being of inverted T-shape in cross-section and defining a bottom limb having oppositely-directd lateral portions, and a plurality of rectangular ceiling tiles supported on said lateral portions of the support member, wherein the clip is of relatively thin sheet form and has inclined sides defining a generally V-shaped symmetrical cross-section, wherein inwardly-directed flanges are provided at the upper ends of said sides of the clip and are located above said oppositely directed lateral portions of one of said elongate support members of the ceiling structure, the clip being deformable to vary the inclination of said sides for the purpose of fitting the clip onto and removing it from said support member, and wherein at least one aperture is provided in the clip and is located at least in part on a line of symmetry of said cross-section of the clip so that an article can be engaged in said aperture and suspended from the clip with its centre of gravity on said line of symmetry.

14. A plaster ceiling fitted with an adaptor carrying a clip for use in suspending lightweight articles from the ceiling, wherein the adaptor is secured to the ceiling and is shaped to define a base which is spaced from the ceiling and which defines a pair of opposite side edges, wherein the clip is of relatively thin sheet form and has inclined sides defining a generally V-shaped symmetrical cross-section, wherein inwardly directed flanges are provided at the upper ends of said sides, said flanges being located over said opposite side edges of the adaptor, the clip being deformable to vary the inclination of said sides for fitting the clip onto and removing it from said adaptor, and wherein at least one aperture is provided in the clip and is located at least in part on a line of symmetry of said cross-section of the clip so that an article can be engaged in said aperture suspended from the clip with its centre of gravity on said line of symmetry.

15. An adaptor for use in suspending a clip from a plaster ceiling as claimed in claim 14, the adaptor comprising a base having a pair of opposite and parallel side edges, and a pair of limbs located at respectively opposite ends of said base and projecting laterally to the same side of said base, the base being apertured to receive a screw for fitting the adaptor to a ceiling with said limbs in engagement with the ceiling so as to space the base from the ceiling surface.

* * * * *